(12) United States Patent
Lin et al.

(10) Patent No.: US 6,519,549 B1
(45) Date of Patent: Feb. 11, 2003

(54) METHOD AND DEVICE FOR DETERMINING ABSOLUTE ANGULAR POSITION OF A ROTATING BODY

(75) Inventors: Yingjie Lin, El Paso, TX (US); Warren Baxter Nicholson, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 156 days.

(21) Appl. No.: 09/628,513

(22) Filed: Jul. 31, 2000

(51) Int. Cl.$^7$ .............................................. G01C 17/00
(52) U.S. Cl. ....................... 702/151; 702/150
(58) Field of Search ........................... 341/11; 123/179; 340/870.21; 702/151

(56) References Cited

U.S. PATENT DOCUMENTS 5,200,747 A * 4/1993 Betz et al. ............. 340/870.21
5,608,394 A * 3/1997 Hirabayashi ................. 341/11

* cited by examiner

Primary Examiner—John S. Hilten
Assistant Examiner—Xiuqin Sun
(74) Attorney, Agent, or Firm—Margaret A. Dobrowitsky

(57) ABSTRACT

A method and device for determining the absolute angular position of a rotating body includes an input gear attached to a rotating body and meshed with a single output gear. The gear ratio between the input gear and the output gear is a non-integer, so that the output gear will be out of phase with the input gear as the input gear completes successive revolutions. A sensor is placed in close proximity to the output gear and provides a signal to a microprocessor representing the angular position of the output gear. This signal is used by the microprocessor to calculate the absolute angular position of the input gear and thus, the absolute position of the attached rotating body.

17 Claims, 1 Drawing Sheet

METHOD AND DEVICE FOR DETERMINING ABSOLUTE ANGULAR POSITION OF A ROTATING BODY

TECHNICAL FIELD

The present invention relates to steering wheel absolute angular position sensors.

BACKGROUND OF THE INVENTION

In many applications, including motor vehicles, it can be important to know the absolute angular position of a rotating body. As but one example, when starting a motor vehicle, it may sometimes be necessary to know which steering revolution the steering wheel is in instantly at power up. Not only does this allow the driver to know which way the front wheels are directed before placing the vehicle into gear, but some computerized vehicle control systems might require knowing the steering position as well. For example, in an automated steering system, such as a steer-by-wire system, the control system must know the position of the steering wheel at all times in order to control the direction of the vehicle. Not only must these systems know the position of the steering wheel, they must know in which revolution the steering wheel is in at the time of measurement. Many of these systems of require that the steering wheel position sensor be accurate within plus or minus one degree (+/−1°) for three hundred and sixty degrees (360°) of steering wheel rotation or within a small percentage of error for eighteen hundred degrees (1800°) of steering wheel rotation for a temperature range of minus forty degrees Celsius to one hundred and twenty five degrees Celsius (−40° C. to 125° C.).

A conventional method for determining the angular position of the steering wheel shaft includes measuring the position of the main shaft and then using a geared down position sensor to determine in which revolution the angular measurement of the main shaft was made. This method is quite simple, but it does not provide the accuracy required by present steering systems.

It happens that a more accurate method for determining the angular position of a steering wheel shaft is disclosed by U.S. Pat. No. 5,930,905 (the "'905 patent"), which issued in Aug. 1999 to Zabler et al. for an invention entitled "Method And Device For Angular Measurement Of A Rotatable Body." The method disclosed by the '905 patent utilizes two gears meshed with a main shaft gear. The main shaft gear has a number of teeth "m", the first additional gear has a number of teeth "n" that is different from the number of teeth on the main shaft gear, and the second additional gear has a number of teeth "n+1". The phase difference between the two additional gears due to the additional gear tooth on the second additional gear is used to determine in which revolution the main gear shaft is in when measurement is taken. The disclosed method can provide the required accuracy, but unfortunately the device disclosed by the '905 patent includes many parts and the method involves significant calculation in order to determine a present steering wheel revolution. As such, these geared systems can be expensive and are more likely to fail over time.

The present invention has recognized these prior art drawbacks, and has provided the below-disclosed solutions to one or more of the prior art deficiencies.

SUMMARY OF THE INVENTION

An absolute angular position sensor assembly includes an input gear, one and only one output gear meshed with the input gear, an input gear sensor to sense the angular position of the input gear, and an output gear sensor to sense the angular position of the output gear. The configuration of the output gear to the input gear is chosen so that the output gear will be out of phase with the input gear as the input gear rotates through a predetermined number of turns.

In a preferred embodiment, the input gear is attached to a rotating body, e.g., a rotating shaft. Preferably, for increased accuracy, the angular speed ratio between the input gear and the output gear is greater than or less than 1.0:1.0. Moreover, the preferred angular speed ratio is a non-integer, such as 1.05:1.0 or 1.0:1.05. In a preferred embodiment, the sensor assembly includes a microprocessor that receives output signals of the sensor and determines an absolute angular position of the input gear based thereon. Preferably, as more fully disclosed below the microprocessor determines the angular position $\Theta$, as being $(n \cdot 360° + Y)/a$.

In another aspect of the present invention, a vehicle control system includes a microprocessor and an absolute angular position sensor assembly that provides a signal to the microprocessor. In this aspect of the present invention, the signal represents an absolute angular position of an input gear.

In yet another aspect of the present invention, a method for determining the absolute angular position of a rotating body includes providing an input gear, providing an output gear, and establishing a non-integer angular speed ratio between the gears having a decimal portion. Signals are generated that represent the relative angular positions of the input and output gear and are used to calculate the absolute angular position of the input gear with relatively high accuracy. The absolute angular position of the input gear is determined as follows:

$$\Theta = (n \cdot 360° + Y)/a$$

wherein:

$\Theta$=absolute angular position of the input gear,

Y=relative angular position of the output gear, a=gear ratio of the input gear to the output gear, and n=number of turns of the output gear relative to the initial (zero) position.

The number of turns of the output gear is determined as follows:

n=1+int($\theta$/360°)+N*int(a), and phase=X*a−Y $\theta$=modulo (phase/360°) if phase>0, otherwise $\theta$=360°+phase Wherein:

x=relative angular position of the input gear,

N=number of turns of the input gear.

The number of turns of the input gear is related to the gear ratio, a, and determined by the phase. For instance, if a=5.2, then $\theta$=0, and N=O;

$\theta$=288, and N=1;

$\theta$=216, and N=2;

$\theta$=144, and N=3;

$\theta$=72, and N=4.

The present invention will now be described, by way of example, with reference to the accompanying drawings, in which:

DESCRIPTION OF AN EMBODIMENT OF THE INVENTION

Figure 1:
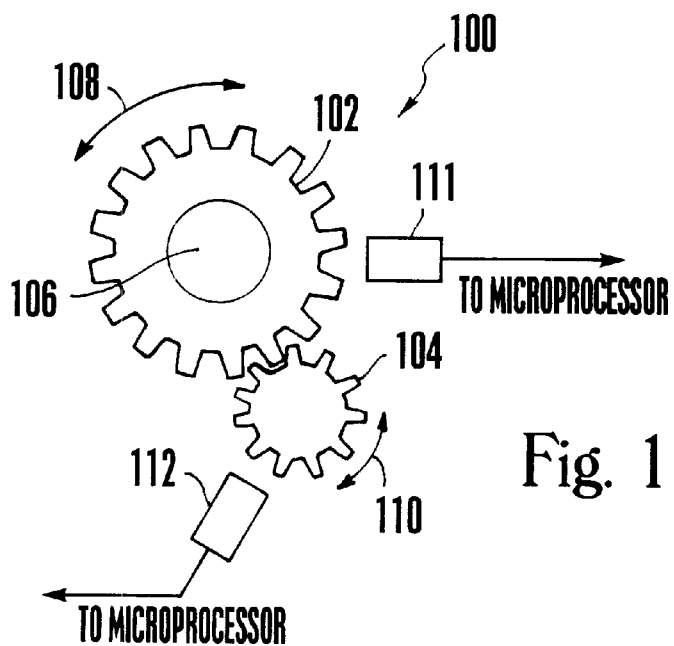
FIG. 1 is a plan view of an absolute angular position sensor assembly.

Referring initially to FIG. 1, an absolute angular position sensor assembly is shown and generally designated 100. FIG. 1 shows that the absolute angular position sensor assembly 100 includes a relatively large input gear 102 meshed with a preferably smaller output gear 104. In a preferred embodiment, the input gear 102 is installed on or otherwise coupled to a rotating shaft 106, e.g., a steering wheel shaft or other rotating shaft, such that the input gear 102 and the shaft 106 rotate together at the same angular velocity in a direction as indicated by arc 108. The output gear 104 rotates about its axis in a direction indicated by arc 110. FIG. 1 also shows an input gear sensor 111 placed in proximity to the input gear 102 and an output gear sensor 112 placed in proximity to the output gear 104. As the gears 102, 104 rotate, the sensors 111, 112 sense the angular positions of the gears 102, 104. Preferably, the sensors 111, 112 are Hall sensors, MR sensors, or any other sensors well known in the art with similar capabilities, with the input gear 102 and the output gear 104 being constructed so as to be sensed by the sensors 111, 112.

In a preferred embodiment, the gear ratio of the input gear 102 to the output gear 104 is chosen such that the output gear 104 rotates with a higher angular velocity than the input gear 102. More specifically, the gear ratio between the input gear 102 and the output gear 104 is chosen so that the gear ratio is not a whole number, e.g., the gear ratio is four and eight-tenths to one (4.8:1) or six and two-tenths or (6.2:1) for measuring five turns of a steering wheel. It is to be appreciated that, for measuring five turns of a steering wheel, the gear ratio may also be five and two-tenths to one (5.2:1), five and four-tenths to one (5.4:1), five and six-tenths to one (5.6:1), or five and eight-tenths to one (5.8:1). It is also to be appreciated that with any of the above gear ratios, after five turns of the input shaft, the input and output gears are back in phase.

For example, with a gear ratio of six and two-tenths to one (6.2:1), after the input gear 102 rotates three hundred and sixty degrees (360°), the output gear 104 rotates two thousand, two hundred and thirty-two degrees (2232°). Thus, the output gear 104 is out of phase with the input gear 102 by seventy-two degrees (72°) and with each additional revolution of the input gear 102, the output gear 104 will be out of phase with the input gear 102 by an additional seventy two degrees (72°). Thus, once the shaft 106 completes five revolutions, the input gear 102 and the output gear 104 are again in phase.

As the input gear 102 and output gear 104 rotate, the sensor 112 senses the angular position of the output gear 104. This information is used by the microprocessor, described below, to determine the absolute angular position of the input gear 102 and the attached rotating shaft 106 using the formula given below, or an algebraic equivalent thereof:

$$\Theta = (n \cdot 360° + Y)/a$$

wherein:
Θ=absolute angular position of the input gear,
Y=relative angular position of the output gear,
a=gear ratio of the input gear to the output gear, and
n=number of turns of the output gear relative to the initial (zero) position.

The number of turns of the output gear is determined as follows:

n=1+int(θ/360°)+N*int(a), and
phase=X*a−Y
θ=modulo (phase/360°) if phase>0; otherwise θ=360°+phase Wherein:
x=relative angular position of the input gear,
N=number of turns of the input gear.

The number of turns of the input gear is related to the gear ratio, a, and determined by the phase. For instance, if a=5.2, then
θ=0, and N=O;
θ=288, and N=1;
θ=216, and N=2;
θ=144, and N=3;
θ=72, and N=4.

Thus, the absolute angular position of the input gear 102 may be determined, e.g., for a range of zero to eighteen hundred degrees (0°–1800°) or five complete turns (N=5) of a vehicle steering wheel when the gear ratio is 6.2:1. It is to be appreciated the present principles can be applied to measure more, or less, than five turns (N>5 or N<5) by appropriately establishing a non-integer gear ratio the whole number portion of which is greater than the maximum number of turns it is desired to measure.

Figure 2:
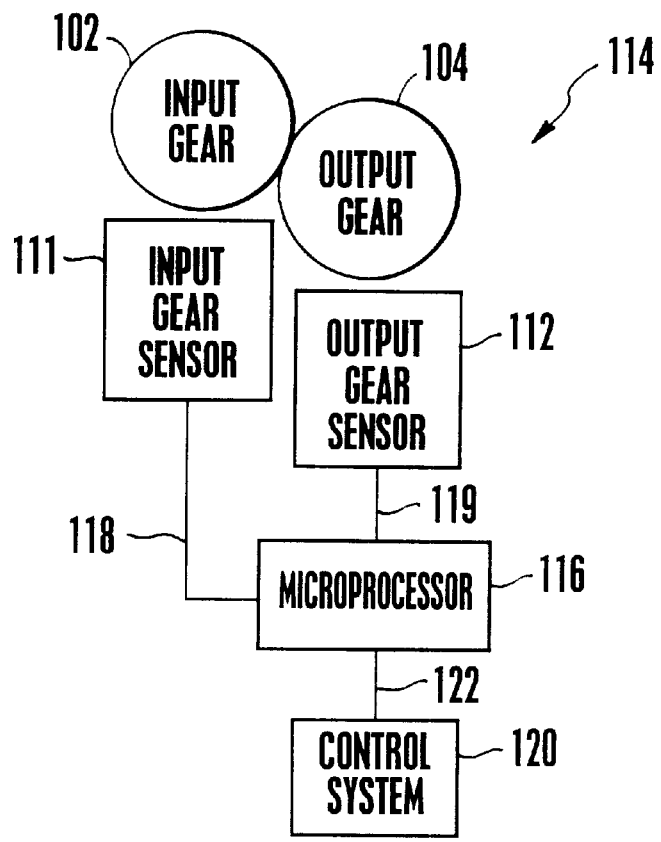
FIG. 2 is a block diagram representing a vehicle control system which incorporates the absolute angular position sensor of the present invention.

Referring now to FIG. 2, a block diagram representing a steering system is shown and designated 114. FIG. 2 shows that the steering system 114 includes the input gear sensor 111 placed in close proximity to the input gear 102 and electrically coupled to a microprocessor 116 via electrical line 118. Moreover, the system 114 includes the output gear position sensor 112 placed in close proximity to the output gear 104 and electrically coupled to the microprocessor 116 via electrical line 119. Accordingly, the microprocessor 116 processes the signals sent from the sensor 112 to determine the absolute angular position of the input gear 102 based on the number of revolutions of the output gear 104 and the angular position of the output gear 104. The microprocessor 116 can then control a vehicle control system 120 using the absolute position of the input gear 102.

With the configuration of structure described above, it is to be appreciated that the method and device for determining the angular position of a rotating body can be used to accurately determine the angular position of a rotating shaft 106 with a minimal amount of parts and minimal calculation. It is also to be appreciated that the relative sizes of the input gear 102 and output gear 104 may be reversed to that the input gear 102 is relatively smaller than the output gear 104. By doing so, the device is able to resolve a relatively larger number of turns of the input gear 102.

While the particular method and device for determining angular position of a rotating body as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component; or method step is explicitly recited in the claims. No claim element herein is to be construed under the provisions of 35 U.S.C. section 112, sixth paragraph, unless the element is expressly recited using the phrase "means for."

What is claimed is:

1. An absolute angular position sensor assembly comprising:
   an input gear attached to a rotating body;
   one and only one output gear meshed with the input gear, the configuration of the input gear with respect to the output gear being chosen so that the output gear will be out of phase with the input gear as the input gear rotates through a predetermined number of turns;
   an input gear sensor to sense the angular position of the input gear; and
   an output gear sensor to sense the angular position of the output gear, an absolute angular position of the input gear being determined at least partly based on a phase difference between the input gear and the output gear.

2. The sensor assembly of claim 1, wherein the rotating body is a rotating shaft.

3. The sensor assembly of claim 1, wherein an angular speed ratio between the input gear and the output gear is greater than or less than 1.0:1.0.

4. The sensor assembly of claim 1, wherein an angular speed ratio is a non-integer, such as 1.05:1.0 or 1.0:1.05.

5. The sensor assembly of claim 1, further comprising a microprocessor receiving an output signal of the sensor and determining an absolute angular position of the input gear based thereon.

6. The sensor assembly of claim 5, wherein the microprocessor determines the absolute angular position, $\Theta$, as being $(n \cdot 360° + Y)/a$, wherein $Y$ = relative angular position of the output gear, $a$ = a ratio of the input gear to the output gear, and $n$ = number of turns of the output gear relative to an initial position.

7. The sensor assembly of claim 6, wherein the microprocessor determines the number of turns of the output gear relative to the initial position, n, as being $1+\text{int}(\theta/360°) + N*\text{int}(a)$, and further wherein N=number of turns of the input gear, and $\theta$=modulo (phase/360°) if phase>0, otherwise $\theta$=360°+phase, wherein phase=$X*a-Y$, and wherein X=relative angular position of the input gear.

8. A vehicle control system comprising:
   a microprocessor; and
   an absolute angular position sensor assembly including an input gear meshed with an output gear, an input gear sensor to sense the number of revolutions of the input gear and the angular position of the input gear, an output gear sensor to sense the number of revolutions of the output gear and the angular position of the output gear, the output gear being out of phase with the input gear as the input gear rotates, the absolute angular position sensor assembly providing a signal to the microprocessor, the signal representing an absolute angular position of an input gear, the absolute angular position of the input gear being determined at least partly based on the phase difference between the input gear and the output gear.

9. The system of claim 8, wherein the input gear is attached to a rotating body.

10. The system of claim 9, wherein the rotating body is a rotating shaft.

11. The system of claim 8, wherein the gear ratio between the input gear and the output gear is greater than or less than 1.0:1.0.

12. The system of claim 8, wherein the angular speed ratio is a non-integer, such as 1.05:1 or 1:1.05.

13. The system of claim 8, further comprising a microprocessor receiving an output signal of the sensor and determining an absolute angular position of the input gear based thereon.

14. The sensor assembly of claim 13, wherein the microprocessor determines the absolute angular position, $\Theta$, as being $(n \cdot 360° + Y)/a$, wherein $Y$ =relative angular position of the output gear, $a$=a ratio of the input gear to the output gear, and $n$=number of turns of the output gear relative to an initial position.

15. The sensor assembly of claim 14, wherein the microprocessor determines the number of turns of the output gear relative to the initial position, n, as being $1+\text{int}(\theta/360°)+N*\text{int}(a)$, and further wherein N=number of turns of the input gear, and $\theta$=modulo (phase/360°) if phase>0, otherwise $\theta$=360°+phase, wherein phase=$X*a-Y$, and wherein X=relative angular position of the input gear.

16. A method for determining the absolute angular position of a rotating body comprising the acts of:
   providing an input gear;
   providing an output gear;
   establishing a non-integer angular speed ratio between the gears having an integer portion at least equal to a predetermined number of rotations;
   generating a signal representative of the angular position of the input gear;
   generating a signal representative of the angular position of the output gear; and
   determining an absolute position of the input gear as follows:

$$\Theta = (n \cdot 360° + Y)/a$$

wherein:
   $\Theta$=absolute angular position of the input gear,
   Y=relative angular position of the output gear,
   a=gear ratio of the input gear to the output gear, and
   n=number of turns of the output gear relative to the initial (zero) position;
   the number of turns of the output gear being determined as follows:
   $n=1+\text{int}(\Theta/360°)+N*\text{int}(a)$, and phase=$X*a-Y$
   $\theta$=modulo (phase/360°) if phase>0, otherwise $\theta$=360°+phase
   wherein:
   X=relative angular position of the input gear,
   N=number of turns of the input gear.

17. The method of claim 16, further comprising the act of: providing a signal to a vehicle control system, the signal representing the absolute angular position of the rotating body.

* * * * *